United States Patent [19]
Boschert

[11] Patent Number: 6,009,835
[45] Date of Patent: Jan. 4, 2000

[54] APPARATUS AND METHOD FOR DISPENSING FROZEN AQUARIUM FOOD

[76] Inventor: Jeffrey D. Boschert, 527 Los Altos Ave., Long Beach, Calif. 90814

[21] Appl. No.: 09/122,586

[22] Filed: Jul. 24, 1998

[51] Int. Cl.[7] .................................................. A01K 61/02
[52] U.S. Cl. ................................... 119/51.04; 119/51.11; 119/56.1; 222/146.6; 222/650; 222/131
[58] Field of Search .............................. 119/51.01, 51.04, 119/51.11–51.15, 56.1, 52.1; 222/146.6, 131, 650, 221

[56] References Cited

U.S. PATENT DOCUMENTS

| | | | |
|---|---|---|---|
| 3,717,125 | 2/1973 | Sanders | 119/51.11 |
| 5,133,292 | 7/1992 | Kirk | 119/51.04 |
| 5,692,392 | 12/1997 | Swier | 222/146.6 |
| 5,709,166 | 1/1998 | Evans et al. | 119/51.04 |

*Primary Examiner*—Andres Kashnikow
*Assistant Examiner*—Dinh Q. Nguyen
*Attorney, Agent, or Firm*—Skjerven, Morrill, MacPherson, Franklin & Friel LLP; Peter H. Kang

[57] ABSTRACT

An automated frozen food dispenser for an aquarium includes an insulated housing which thermally insulates the dispenser. Inside the housing are compartments, arranged in a wheel, which are filled with a quantity of frozen food. The compartments rotate over a plate which has a hole directly above a trap door which remains closed unless acted upon. The compartments are mounted on a spoke and hub system. A rotation controller causes the compartments to rotate at a predetermined rate, such that the compartments, one at a time, hold their frozen food over the hole. The food then falls onto the trap door which leads to a vertical conduit in the bottom of the shell. A motor-driven piston is positioned above the compartment directly aligned above the trap door. At a predetermined schedule, the piston moves downward and opens the trap door. The frozen food is then dispensed out of the bottom of the dispenser. After this, the piston retracts vertically upward, to a sufficient height to allow the compartments to rotate, and allow the spring-loaded trap door to shut. Thermo electric coolers are mounted in the housing to draw heat away from the center and, towards the top of the unit. The thermo-electric coolers are connected to a heat sink attached to the top of the shell and act as a heat pump. The heat sink dissipates heat thus removed from the inside of the dispenser. Frozen food is maintained in the compartments without thawing.

20 Claims, 4 Drawing Sheets

APPARATUS AND METHOD FOR DISPENSING FROZEN AQUARIUM FOOD

BACKGROUND

1. Field of the Invention

This invention relates generally to an apparatus and method for automatic dispensing of food for an aquarium and, more specifically, to systems for dispensing frozen food for aquariums.

2. Description of Related Art

Aquariums housing fish or other aquatic creatures are widely used as decorative displays in homes and businesses. Aquariums may be used to keep fresh water fish or other creatures or, alternatively, salt water or marine fish or other aquatic organisms. One of the problems facing owners or operators of aquariums is the proper and consistent feeding of fish with food of a high nutritional content. Aquarium owners have the option of manually feeding their fish several types of fish food, such as dry flake food, freeze-dried food, or frozen food.

In conjunction with aquariums, an automated food dispensing device may be used by the owner or operator of the aquarium. Automated food dispensing devices for aquariums offer several advantages to aquarists, in that they free the aquarists from the required duties of feeding fish or other aquatic organisms at predetermined or regular times during the day. An automated food dispenser also provides free time to the aquarist, thus allowing the aquarist to devote time to other activities such as, for example, vacation, other business duties, or other recreational activities. Additionally, automated food dispensers allow aquarists the freedom simply not to have to touch their aquarium for days or even weeks at a time.

A variety of systems for automatically dispensing food for an aquarium has been developed. Automated feeding devices for aquariums are widely used currently and are made by a variety of manufacturers. Examples of such feeding devices include the Daily Double model available from the company Penn-Plax; the Rondomatic model by Tetra; the Feed-Air model by Eheim; and the Fishmate model by Animate. Such automated feeding devices have varied configurations allowing automated feeding from, for example, seven days up to thirty days, or more.

For example, one general approach to automated dispensing of aquarium food includes a feeding unit which is placed on a platform or ledge above the surface water of an aquarium. The food dispenser unit includes a receptacle bin for holding food. Typically, dry flake food is loaded into the bin. This bin is rotatably mounted on a horizontal shaft connected to a motorized control chassis. The bin includes a small aperture or hole at the top. At predetermined times, the controller in the chassis causes the motor to rotate the shaft one full revolution. This causes the food-containing bin to rotate about its longitudinal axis. As the bin rotates, the hole in the bin begins to rotate downward. As the hole approaches the surface of the water, food within the bin falls out of the hole and into the aquarium. The shaft continues rotating until it completes one whole revolution of 360 degrees, resulting in the bin being placed in the same position in which it started, with the hole or aperture at the top.

As discussed above, aquarists have several choices of the types of food that can be given to fish. Salt-water or marine fish (and other creatures) have nutritional requirements which are better satisfied with the use of frozen foods. To a lesser extent, the same is true of fresh-water fish or other freshwater organisms. Frozen food can provide better for the health and longevity of fish and other marine life, especially as compared with non-frozen foods, such as dried flake food or freeze-dried foods.

The desire to use frozen fish food raises several issues which existing conventional food dispensers, such as those discussed above, cannot solve. Conventional automated feeding devices for aquariums suffer from a major drawback and shortcoming, in that all existing automatic feeder designs are capable of dispensing only non-frozen foods to the fish or other aquatic creatures. Existing food dispensers cannot accommodate frozen food and cannot keep the frozen food unthawed. Frozen fish food, by its nature, must remain cold or else it will create unwanted water build-up, will cause undesirable mess and odor problems, and will lose nutritional value as it begins to rot.

If an aquarist has a salt-water aquarium, then such an aquarist is only able to use existing automated food dispensers which fail to provide the nutritional benefits of frozen food. Similarly, if an aquarist wishes to provide frozen food to fish in a freshwater aquarium, such an aquarist would be unable to do so with conventional food dispensers. For example, an aquarist with a salt-water aquarium who wishes to leave the aquarium untended for a length of time (for example, during a vacation) is currently only able to provide dry flake or freeze-dried food with an existing automatic food dispenser, which may lead to nutritional deficiencies and health problems for the fish, including the possibility of death. Further to this example, such an aquarist's other option is to risk having another person, who may or may not be familiar with aquariums, tend for the feeding of the fish manually, which poses a risk of either overfeeding or underfeeding, and thus creates a risk of health problems, including possibly death, for the fish.

In sum, aquarists wishing to provide frozen food to their fish are simply unable to gain all the benefits of an automated food dispenser, discussed above.

Accordingly, an automated system and method for dispensing frozen food to an aquarium is desired.

SUMMARY

It is therefore an object of the present invention to provide a novel apparatus and method for dispensing frozen aquarium food.

It is another object of the present invention to provide a novel apparatus and method for dispensing aquarium food where such food is frozen and is kept unthawed until dispensed.

In accordance with one aspect of the invention, an automated frozen food dispenser is positioned on a ledge or platform above the surface water of an aquarium. The dispenser includes an insulated housing which envelops, thermally insulates, and, in one embodiment, is molded to fit and retain the interior elements of the dispenser. In one embodiment, the housing may be fashioned of expanded rigid polystyrene plastic. Inside the housing or shell are a series of horizontal compartments which are filled with a predetermined quantity of frozen food. The frozen food may be in the form of a pellet or any similar quantity of food, and alternatively may be any assortment of a plurality of types of frozen foods.

In one embodiment, the compartments are formed by radially dividing an annular channel with regularly spaced divider walls, whereby the walls of the channel and the divider walls make up the walls of each channel. Thus, the compartments form a wheel. The compartments in this embodiment sit atop a circular plate of equal or slightly greater diameter as the diameter of the compartment wheel. This circular plate forms the bottom floor for each of the compartments. As discussed below, the bottom circular plate has a hole, equal in size to the dimensions of one compartment, formed directly above a trap door which leads to an external conduit to the bottom of the dispenser unit. This trap door has a spring-loaded hinge so that it remains in a closed, horizontal position until acted upon. This trap door is also thermally insulated.

Alternatively, the compartments may be fashioned by laterally subdividing a horizontal, circular grooved channel with regularly-spaced divider walls between each compartment and its neighbors. The bottom of each compartment, in this embodiment, includes a trap door which is spring-loaded so as to remain in the closed or horizontal position unless acted upon. The trap door of each compartment is heat-insulated.

In any embodiment, the compartments may be fashioned as pockets or trays, sufficient to contain and hold a quantity of food. In alternative embodiments, the arrangement of compartments may be altered and need not be in an annular shape, for example the compartments may be arranged in a row on a movable conveyor belt.

In the embodiments utilizing a wheel of compartments, the annular configuration of compartments are mounted on a spoke and hub system, thus enabling the series of compartments to rotate around a central hub. The hub is vertically mounted on the interior, surface of the insulating housing. A plurality of spokes, appropriate to the size of the compartment wheel, radially connect the hub to the grooved channel forming the compartments.

In this system, a rotation controller, attached to the grooved channel forming the compartments, causes the grooved channel to rotate at a predetermined rate. This rotation controller may comprise a motor controlled by programmable control circuitry which causes the grooved channel to rotate at either a predetermined rate or at predetermined times.

In the embodiment in which the wheel of compartments is placed on a circular plate, the rotation controller rotates the compartments over the plate so that each compartment (along with the food stored therein) comes to rest, one at a time, in a position directly above a hole formed in the bottom circular plate. As each compartment rotates into position over the hole, the food in the compartment falls through the hole and onto the thermally-insulated trap door mounted directly below the hole and in the floor of the interior of the dispensing unit.

In this embodiment, a motor-driven piston is positioned directly above the compartment which is directly aligned above the trap door leading to the opening in the bottom of the insulating shell. At a predetermined schedule, the piston dispenses the frozen food out of the compartment by moving downward, through the space defined by the compartment, through the hole in the circular bottom plate, and ultimately forcing open and downward the trap door. The frozen food falls through the trap door and is then dispensed through the vertical conduit to the opening in the bottom of the insulating shell, and thus into the aquarium.

In the embodiment in which each compartment has its own trap door, the compartments are rotated by the rotation controller such that the compartments, one at a time, come to rest holding their frozen food over a vertical conduit leading to an aperture or opening fashioned in the bottom of the insulating shell.

In this embodiment, a motor-driven piston is positioned directly above the compartment which is directly aligned above the opening in the bottom of the insulating shell. At a predetermined schedule, the piston dispenses the frozen food out of the compartment by forcing open and downward the trap door at the bottom of the compartment. The frozen food is then dispensed out of the compartment, through the vertical conduit to the opening in the bottom of the insulating shell, and thus into the aquarium.

In any embodiment, after the frozen food is dispensed, the piston retracts vertically upward, thus allowing the spring-loaded trap door to shut again. All the trap doors are thermally insulated in order to maintain the low temperature desired for the interior of the dispenser unit. The piston retracts to a sufficient height to allow the wheel of compartments to rotate freely, so that the next compartment may be presented under the piston and over the hole in the bottom of the shell.

In one embodiment, the motor and control elements for the piston are mounted on the exterior and on top of the housing. This arrangements prevents the heat generated by the piston's controller from affecting the temperature of the frozen food. In this arrangement, the piston is arranged so that it moves in a vertical channel or tube extending from the top of the dispenser down to and including the vertical conduit leading to the bottom exterior of the dispenser.

The temperature of the interior of the dispenser unit is maintained at a low level through the use of internal cooling devices. In one embodiment, one or more thermo-electric coolers are used. In another embodiment, one or more thermo-electric coolers are used in conjunction with a heat sink. A thermo-electric cooler or refrigerator is a semiconductor device which uses the Peltier effect to move heat to when a current is applied, and will act as a heat pump and move heat away from a source towards an opposite direction. In one embodiment, one or more thermo-electric coolers are mounted in the insulating shell above the center hub of the compartment wheel. The thermo-electric coolers are mounted so as to draw heat away from the center of dispenser unit, towards a hole in the top of the dispenser unit. The two thermo-electric coolers may be stacked, one on top of the other, in a vertical tube above the center of the compartment wheel. The thermo-electric coolers will move heat from the center of the dispenser to the top of the system. Above the uppermost thermo-electric cooler is a heat sink which is attached to the top exterior of the insulating shell. The thermo-electric coolers are attached to the heat sink, and the heat sink will dissipate heat removed from the inside of the dispenser unit, by the thermo-electric coolers, and out into the atmosphere outside the entire dispenser unit.

In one embodiment, the heat sink is fashioned of aluminum. In another alternative embodiment, the heat sink may include an electric fan which further acts to dissipate heat from the heat sink to the outside air.

With these apparatus and method aspects of the present invention, frozen food is dispensed in an aquarium at a predetermined schedule while preserving the food in its unthawed state.

BRIEF DESCRIPTION OF THE DRAWINGS

Use of the same reference symbols in different figures indicates similar or identical items.

DETAILED DESCRIPTION

Figure 1:
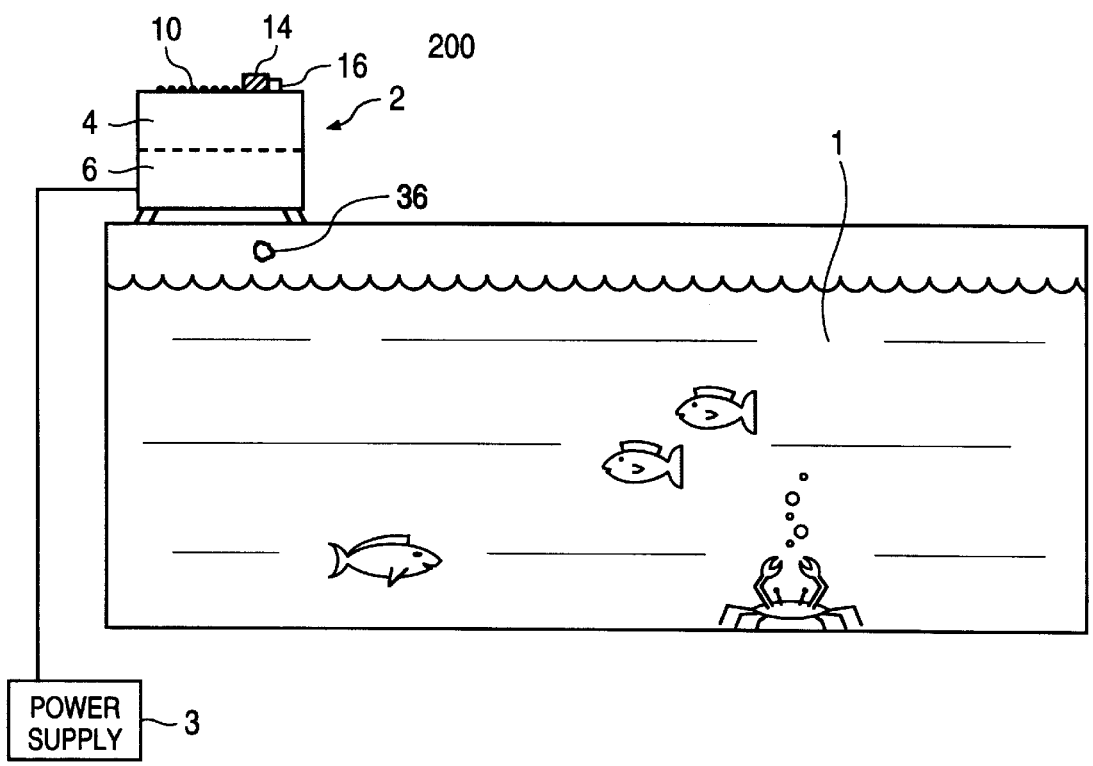
FIG. 1 shows one embodiment of an apparatus for dispensing frozen food, in accordance with an embodiment of this invention, in relation to an aquarium.

FIG. 1 shows an automated frozen food dispenser 2 positioned above the surface water of an aquarium 1. Aquarium 1 may be either a fresh-water aquarium or a salt-water aquarium. Aquarium 1 may be any conventional residential, commercial, or industrial aquarium, and may be used to keep alternatively fresh water fish or salt water or marine fish or other aquatic organisms. Aquarium 1 may be of any predetermined size. Frozen food element 36 is shown in FIG. 1 being dispensed into aquarium 1. Food 36 may be any conventional form of frozen food suitable for salt water or marine fish, fresh water fish, or other aquatic organisms. Alternatively, food material 36 may be any mixture of a plurality of types of frozen food suitable for fish or other aquatic creatures, or may be any nutrition supplement or even medicine, fungicide, water conditioner, or other additive appropriate for aquarium 1 or the organisms being kept therein.

Figure 2:
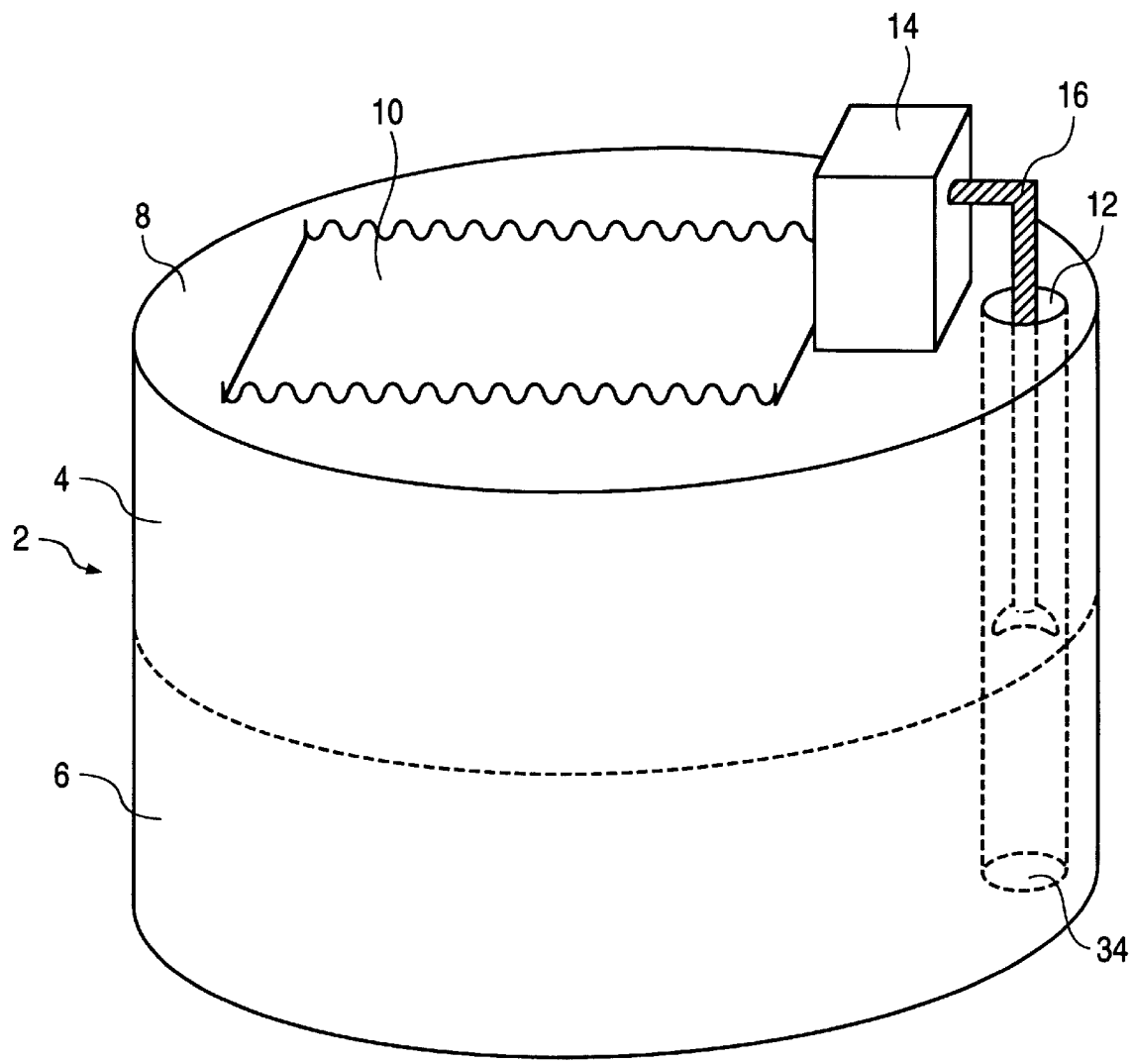
FIG. 2 shows a perspective view of features of a system for dispensing frozen food in accordance with an embodiment of this invention.
Figure 3:
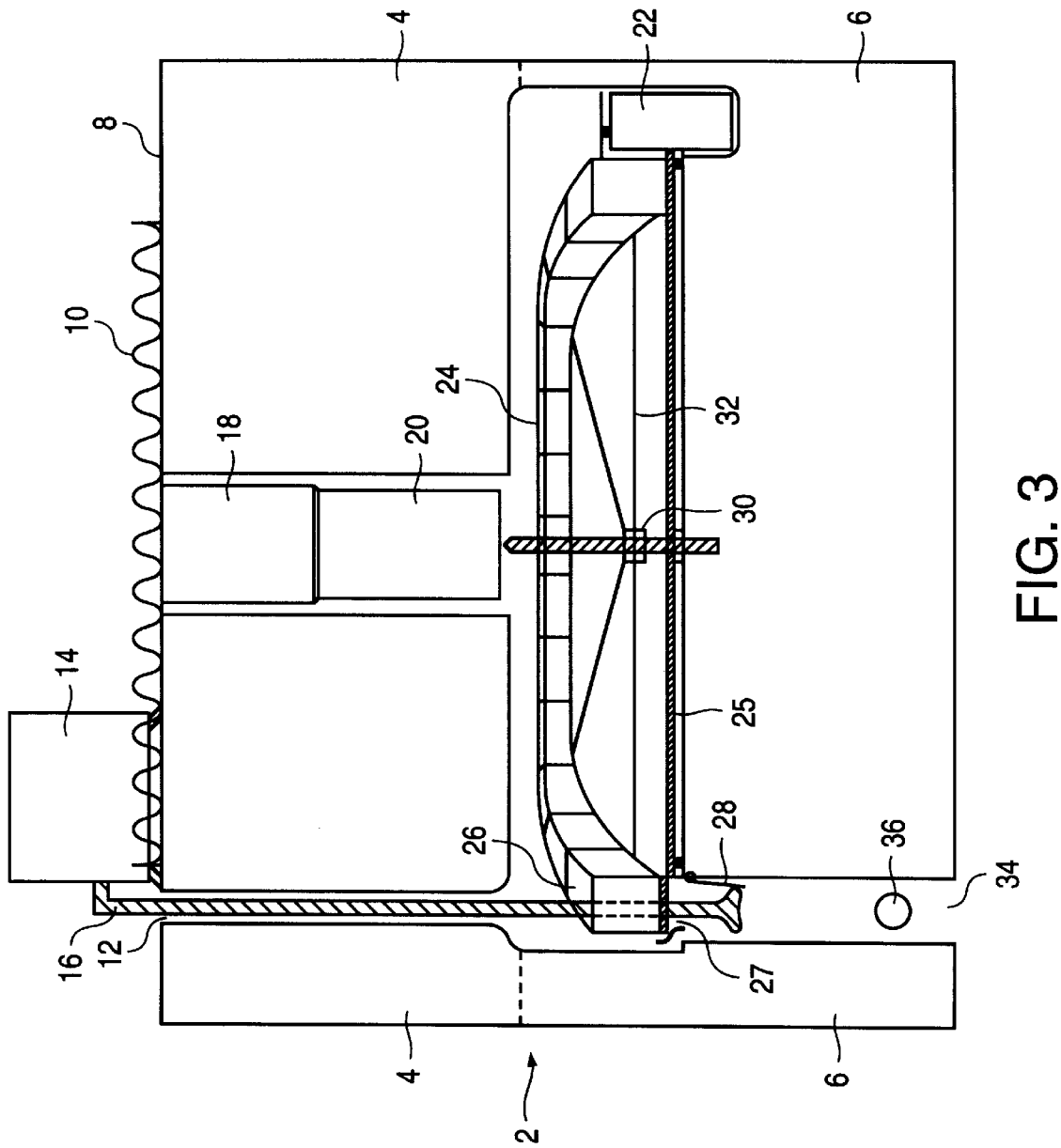
FIG. 3 shows a vertical cross-sectional view of the features of a system in accordance with an embodiment of the invention.

Dispenser system 2 includes a bottom aperture or hole 34 (shown in FIG. 2). System 2 is positioned above aquarium 1 on a ledge or platform, such that bottom aperture 34 is positioned above the surface of the water in aquarium 1. As shown in FIGS. 1 and 3, frozen food material 36 is dispensed from system 2 through aperture 34 and into aquarium 1.

Dispenser 2 is connected to power source 3, which may be any conventional power source, such as a an electrical outlet, a battery or any commercial or industrial source of power. Power source 3 is connected to the motorized control and electrical elements comprising dispenser system 2 as appropriately required. Alternatively, power supply 3 may be, for example, a battery integral or internally stored and mounted on, within, or as part of dispenser system 2.

FIG. 2 shows primarily the features of system 2 which are externally visible. The dispenser 2 includes an insulated housing or shell, which envelops and thermally insulates the interior elements of the dispenser 2. In one embodiment, the insulated shell is in two parts 4 and 6 roughly corresponding to an upper and lower half, respectively. These two parts 4 and 6 can be manually separated to allow access to the interior of the dispenser, for example to fill the dispenser compartments 26 with food 36 or to set the configuration of rotation controller 22 (see FIG. 3). Alternatively, the insulating housing may be laterally divided into right and left portions, or any other configuration appropriate for allowing access to the interior of system 2 without substantially affecting the thermal insulating properties of the housing.

Food dispenser 2 includes a top aperture 12 and a bottom aperture 34 formed in the insulating shell. Aperture 34 is an opening in the bottom surface of lower portion 6 of dispenser 2. Top aperture 12 is an opening in top surface 8 of upper portion 4 of dispenser system 2. Top aperture 12 forms a tube or channel within which piston 16 is introduced vertically into the interior of system 2. Piston-controller 14, shown in this embodiment mounted on top surface 8, operates on and controls the movement of piston 16 upward and downward. Heat sink 10 is attached to the top surface 8 of the upper portion 4 of insulating housing for system 2.

The thermally insulating and enveloping housing may be manually opened between upper part 4 and lower part 6, and alternatively one or more hinges may connect upper and lower portions 4 and 6 so that they form a clamshell or similar shape which can be opened to gain access to the interior elements of system 2.

The thermally insulating housing or shell is, in one embodiment, fashioned out of expanded rigid polystyrene plastic. Alternatively, the insulating housing may be any thermally insulating material, including an external casing or shell to provide support and sufficient rigidity to retain the internal elements of dispenser system 2. In one embodiment, thermally insulating housing sections 4 and 6 are formed of expanded rigid polystyrene plastic to envelop the internal elements of system 2 with approximately two inches of insulating material on all sides and are formed in such a fashion so as to support and retain the interior assemblies of food dispensing system 2 discussed below.

FIG. 3 shows one embodiment, in cross-section view, of external and internal elements of frozen food dispensing system 2 in relation to one another.

A series 24 of horizontally aligned compartments 26 are arranged within a central chamber inside food dispensing system 2. This collection of compartments 24 comprises containers sufficient to hold a predetermined quantity of frozen food 36 within each compartment 26. Each compartment 26 is of equal size and dimension as each other compartment 26 forming the collection of compartments 24. Alternatively, compartment 26 may be fashioned as a pocket, a tray, or any shape appropriate to contain and hold a predetermined quantity of frozen food 36.

Frozen food 36 may be in the form of a pellet or any appropriate quantity of food. As discussed above, alternatively element 36 may be any assortment of any plurality of types of appropriate frozen foods, nutrion supplements, or any desired additive appropriate for aquarium 1.

In one embodiment, the collection of compartments 24 are fashioned by radially subdividing a horizontally arranged annular channel with regularly spaced divider walls set laterally between each compartment 26 and its neighbors. The divider walls and the walls of the grooved channel form the walls of each compartment 26. The collection of compartments 24 sits atop, but is not fixedly attached to, a bottom circular or annular plate 25 of equal or greater diameter as the collection of compartments 24. As discussed below, the collection of compartments 24 rotates, while bottom plate 25 does not. Plate 25 forms the bottom surface for each individual compartment 26. Plate 25 is mounted on and fixed in position in relation to the interior surface of lower portion 6 of insulating housing.

Plate 25 has a hole 27 formed in its surface, and this hole 27 is directly aligned with and above trap door 28. Hole 27 is of equal or substantially equal area or size as compartment 26.

Trap door 28 is spring loaded along its hinge so that it will remain closed and in a horizontal position unless acted upon. Further, trap door 28 is heat insulated or otherwise fashioned so as to participate in thermally insulating the interior chamber of dispenser system 2.

In another embodiment, the collection of compartments 24 are fashioned by radially subdividing a horizontal circular grooved channel with regularly spaced divider walls set laterally between each compartment 26 and its neighbors. The divider walls and the walls of the grooved channel form the walls of each compartment 26 and each individual compartment 26 has a unique trap door 28 formed as its bottom surface. Each trap door 28 is spring loaded along its hinge so that it will remain closed and in a horizontal position unless acted upon. Further in this embodiment, each trap door 28 in each compartment 26 within the collection of compartments 24 is heat insulated or otherwise fashioned so as to thermally insulate the frozen food 36 stored within each compartment 26.

As shown in FIG. 3, the collection of individual compartments 26 are formed in an annular or circular shape forming a wheel 24. This annular configuration of compartments 24 is mounted on a spoke and hub system 30 and 32. Hub 30 is vertically mounted on the interior surface of lower portion 6 of the insulating housing. A plurality of spokes 32 radially connect hub 30 to the wheel of compartments 24 sufficient to support the wheel of compartments 24 and allow them to rotate around hub 30. One of ordinary skill will understand that the number of spokes needed to adequately support and rotatably connect the collection of compartments 26 will depend on the number compartments 26 and size of wheel 24.

Rotation controller 22 is connected to the wheeled collection of compartments 24. Rotation controller 22 may comprise an electric motor, which uses gears or a friction wheel to engage the surface of compartments 24 so as to cause the wheel of compartments 24 to rotate at a predetermined rate or at predetermined times. Rotation controller 22 may be mounted within the insulating housing portions 6 or 4. Alternatively, rotation controller 22 may be mounted on the exterior surface of insulating housing portions 4 and 6, in which case an aperture or opening must be provided to allow the gear or friction wheel assembly of rotation controller 22 to engage and cause to rotate the collection of compartments 24.

Although rotation controller 22 is shown mounted to the side of compartments 26 in FIG. 3, alternatively, rotation controller 22 may be mounted above, below, or in any appropriate position in relation to either the collection of compartments 24 or spoke and hub system 30 and 32, as long as rotation controller 22 is engaged in such a way to effectuate rotation of the compartments 26.

Rotation controller 22 causes the compartments 26 to rotate at a predetermined rate or at predetermined times appropriate to the desired feeding cycle for aquarium 1. As noted, rotation controller 22 may comprise an electric motor controlled by control circuitry, which causes the collection of compartments 24 to rotate at either a predetermined rate or at predetermined times or schedule. Rotation controller 22 may be user programmable and reprogrammable so as to allow variation in the rate of rotation and thus feeding.

Rotation controller 22 causes the compartments 26 to rotate such that each compartment 26, one at a time, comes to rest in a position directly above hole 27 in bottom plate 25. Food is transferred from compartment 26 to aperture 34 and thence to the aquarium 1 as follows:

As rotation controller rotates wheel 24, each compartment 26 will in turn pass over hole 27. Food element 36 in compartment 26 will fall through hole 27 and onto the surface of trap door 28.

Piston 16, in its rest state, is withdrawn into top aperture 12 such that piston 16 does not touch and is not within the space defined by compartment 26. At a predetermined time or schedule after food element 36 has fallen onto trap door 28, piston controller 14 actuates piston 16 by pushing piston 16 downward through top channel 12 such that piston 16 will enter the space defined by compartment 26. Piston 16 will continue downward until it impacts frozen food element 36. Piston 16 will continue further downward until the force of its downward motion causes trap door 28 to open. Piston 16 will complete its downward motion such that it allows food element 36 to fall or be introduced into bottom aperture 34. Piston 16 pushes aside trap door 28 and frozen food element 36 egresses through bottom aperture 34 and thence into the aquarium 1 below as shown in FIGS. 1, 3, and 4B.

Figure 4A:
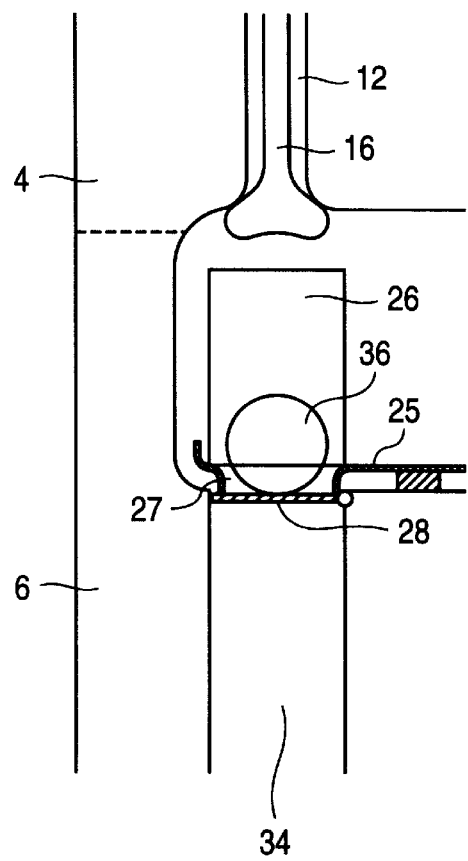
FIGS. 4A and 4B show piston and compartment subassemblies during and before operation in accordance with an embodiment of the invention.
Figure 4B:
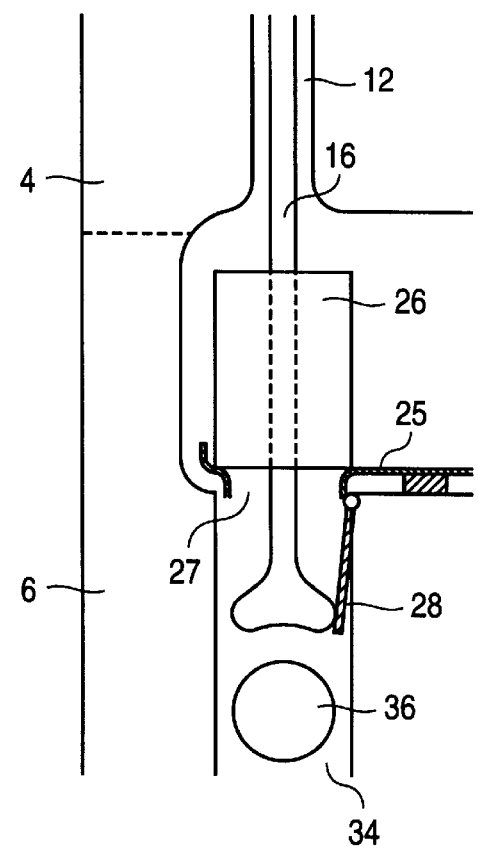

FIGS. 4A and 4B demonstrate the action of piston 16 before and during operation of the above-described feeding sequence. In FIG. 4A, rotation controller 22 has rotated wheel 24 over plate 25, such that a compartment 26 has come to rest above and directly aligned over hole 27 and trap door 28. Food element 36 has fallen through hole 27 onto trap door 28.

Piston 16 is withdrawn above compartment 26 and rests within channel 12. In one embodiment, the bottom flattened portion of piston 16 rests against the bottom opening of aperture 12 so as to seal aperture 12 and thermally insulate the compartments 26 from the exterior atmosphere. In one embodiment, all of piston 16 or the flattened head portion thereof may be fashioned from a thermally insulating material. As shown in FIG. 4A, trap door 28 is in the closed or horizontal position. Trap door 28, in this position, prevents food element 36 from falling into bottom aperture 34. The spring-loaded hinge of trap door 28 is sufficiently resistive so as to support the weight of food element 36.

As shown in FIG. 4B, piston 16 has been actuated by piston controller 14 in a downward motion. Piston 16 has moved downward through top aperture 12, through the space defined by compartment 26, and further downward so as to force trap door 28 to open. The spring-loaded hinge of trap door 28 should not be so resistive as to prevent piston 16 from opening door 28. The downward action of piston 16 thus allows food element 36 to fall or be introduced into aperture 34 and thence into the aquarium 1.

To prepare for the next feeding cycle, piston controller 14 will actuate piston 16 and raise piston 16 upward and out of the position shown in FIG. 4B. Piston controller 14 will move piston 16 in an upward direction so as to withdraw the piston entirely from the space defined by compartment 26 and back to its starting or rest position as shown in FIG. 4A. Once piston 16 is removed, trap door 28 will return to its closed position due to its spring-loaded hinge. After piston 16 has withdrawn from the space defined by compartment 26, rotation controller 22 (shown in FIG. 3) will cause the wheel of compartments 24 to rotate a sufficient amount to cause the next neighboring compartment 26 to present itself underneath piston 16 as shown in FIG. 4A. The food 36 in this next compartment 26 will fall through hole 27 in plate 25 and onto the now closed trap door 28. Thus, the cycle will repeat itself for the next feeding.

Piston controller 14 may comprise an electric motor controlled by control circuitry, including a clock or timer, which causes piston 16 to move upward and downward at predetermined times or on a predetermined schedule (e.g., once a day, twice a day, once every six hours, or some other predetermined time interval). Piston controller 14 may be user programmable and reprogrammable to allow variation in the rate of feeding. Care should be taken to coordinate the schedule of the movement of piston 16 with the rotation of the wheel of compartments 24.

In one embodiment, piston controller 14 and rotation controller 22 are separate elements as shown in FIG. 3. In another embodiment, a master controller may be used to simultaneously control the actuations of piston controller 14 and rotation controller 22. In the embodiment where piston controller 14 and rotation controller 22 are separate elements, piston controller 14 and rotation controller 22 are programmed or mechanically configured so as to operate in synchronicity such that piston 16 withdraws from the space defined by compartment 26 before rotation controller 22 causes the wheel of compartments 24 to rotate. Appropriate configuration for piston controller 14 and rotation controller 22 should ensure that piston 16 does not interfere with the rotation of the compartments 26.

As shown in FIG. 4A, when piston controller 14 causes piston 16 to withdraw upward out of compartment 26, the trap door 28 will return to its closed and horizontal position due to the reflexive properties of the spring loaded hinge of trap door 28. Alternatively, trap door 28 can comprise any suitable mechanical or electro-mechanical recoil mechanism sufficient to cause trap door 28 to return to a closed and horizontal position after piston 16 has been withdrawn away from trap door 28 and upward towards top channel 12.

FIG. 3 shows piston controller 14 mounted on the top surface 8 of upper portion 4 of the thermally insulating housing of food dispensing system 2. In this embodiment, the placement of piston controller 14 on the exterior of food dispenser system 2 prevents heat generated by piston controller 14 to affect the interior temperature of food dispenser unit 2. Alternatively, piston controller 14 may be mounted on the exterior side of the thermally insulating housing portion 4 or may be mounted within the interior of thermally insulating housing 4.

As discussed above, power supply 3 is connected appropriately to piston controller 14 and rotation controller 22.

In the alternative embodiment in which each compartment 26 has its own unique trap door 28 and in which there is no bottom plate 25, food element 36 is dispensed into bottom aperture 34 in a similar fashion. Rotation controller rotates the wheel of compartments 24 so that one compartment 26 comes to rest directly under piston 16 and directly above bottom aperture 34. Piston controller 14 actuates piston 16, so that piston 16 moves downwards. Piston 16 moves downward into the space defined by compartment 26 and further downward so as to force trap door 28 to open. The downward action of piston 16 thus allows food element 36 to fall or be introduced into aperture 34 and thence into the aquarium 1.

Piston 16 will be retracted by controller 14, allowing trap door 28 to close. After piston 16 is retracted, rotation controller 22 causes wheel 24 to rotate a sufficient amount to cause the next compartment 26 to come to rest directly below piston 16 and directly above conduit 34. Thus, the cycle may repeat itself for the next feeding.

FIG. 3 shows cooling elements 18 and 20 mounted above the collection of food compartments 24. Cooling elements 18 and 20 may comprise one or more cooling elements depending on the size of the food dispenser unit 2 and the consequent amount of cooling required. Although shown stacked one atop the other in FIG. 3, cooling elements 18 and 20 may be aligned side by side or in any other configuration appropriate to maintain the interior of dispenser 2 at a low enough temperature so that food element 36 will not thaw.

In one embodiment, cooling elements 18 and 20 are thermo-electric coolers or thermo-electric modules or refrigerators. In one novel aspect of the present invention, thermo-electric coolers are used in conjunction with other elements of the food dispensing unit 2 to allow frozen food 36 to be stored and maintained within the compartments 26 of dispenser 2 without thawing.

A thermo-electric cooler is a semiconductor device which makes use of the Peltier effect to move heat in a particular direction when current is supplied to the thermo-electric cooler. A thermo-electric cooler acts as a heat pump and moves heat away from a source and towards an opposite direction. A thermo-electric module takes advantage of the different electrically properties of different semiconducting materials to achieve this heat pumping effect. One advantage of using a thermo-electric cooler or thermo-electric module is that it is relatively small and is a solid state device. Thermo-electric coolers provide a cooling or refrigerating capability without the need for refrigerants, such as freon, or compressors. When power is applied to a thermo-electric module, heat moves in the direction of the current such that the heat is pumped from one side of the module to the opposite side. As shown in FIG. 3, thermo-electric coolers 18 and 20 are arranged so that when power is applied to elements 18 and 20 heat will move or be pumped from the bottom of modules 18 and 20 toward the top of dispenser unit 2 in the direction of heat sink 10.

In one embodiment, one or more thermo-electric modules 18 and 20 are mounted within a channel or tube formed in the upper portion of insulating housing 4 of food dispenser 2. Thermo-electric modules 18 and 20 may be arranged side-by-side or in any appropriate configuration. The thermo-electric coolers 18 and 20 draw heat away from the center interior portion of the food dispenser unit 2, including especially compartments 26 and food 36, toward the top of the unit. A hole in top surface 8 of upper insulating portion 4 allows the heat from thermo-electric modules 18 and 20 to be pumped to the exterior atmosphere.

In the embodiment shown in FIG. 3, two thermo-electric coolers 18 and 20 are stacked one on top of the other in a vertical tube or channel formed within the upper portion of insulating housing 4. The thermo-electric coolers 18 and 20 are connected through a hole in top surface 8 to heat sink 10. Heat sink 10 is also attached to the top exterior surface 8 of insulating housing 4. When power is applied, thermo-electric coolers 18 and 20 are adapted to transfer heat from the interior chamber of dispenser 2 to heat sink 10, such that heat sink 10 will in turn dissipate heat into the exterior atmosphere. Thus, frozen food elements 36 stored in each compartment 26 in the center of food dispenser unit 2 will remain unthawed due to the cooling effect provided by thermo-electric coolers 18 and 20. Insulating housing portions 4 and 6 also serve to maintain the necessary low temperature by thermally insulating the interior of the dispenser 2 from the external atmosphere. As discussed above, trap door 28 and piston 16 may also be formed of, or be lined with, thermally insulating material to assist in thermally insulating the interior of dispenser system 2. The cooling effect provided by thermo-electric coolers 18 and 20, in conjunction with the thermal insulation of the various parts of system 2, result in food elements 36 not thawing while waiting to be dispensed.

In one embodiment, heat sink 10 is fashioned of aluminum. Alternatively, heat sink 10 may include an electric fan which will further act to dissipate heat drawn away from the center of food dispenser unit 2 by thermo-electric coolers 18 and 20.

Thermo-electric coolers 18 and 20 are appropriately configured to receive power from power supply 3. Heat sink 10, if it uses an electric fan, is also appropriately configured to receive power from power supply 3.

Cooling elements 18 and 20 may alternatively comprise conventional cooling elements, such as a pipe system with a refrigerant, such as freon, connected to an external compressor mounted outside the exterior surface of food dispenser unit 2.

While the above disclosure of the invention has been particularly shown and described with reference to particular embodiments thereof, it will be understood by those skilled in the art that the foregoing and other changes in form and detail may be made therein without departing from the spirit and scope of the invention. Specific dimensions discussed with respect to particular embodiments above are not intended to limit the scope of the invention, but to illustrate specific embodiments of the invention. The above descriptions are only examples of the invention's applications and should not be taken as limitations.

Many elements and subassemblies described above could be chosen or arranged differently while still embodying the present invention. While those of ordinary skill will appreciate interchangeable substitutions for the elements discussed above, examples of alternative embodiments include but are not limited to:

Different numbers of cooling elements 18 and 20; different numbers of compartments 26 making up collection 24; different geometrical arrangement of the collection of compartments 24, such as in a row or line on a movable conveyor belt (in which embodiment, rotation controller 22 would be substituted for a conveyor belt mover); other control circuitry to control the operation of either piston controller 14, rotation controller 22, or both; different geometrical shapes for each compartment 26; coating any or all the surfaces of compartments 26, plate 25, trap door 28, piston 16, or the walls of aperture 34 with a suitable coating or resin to prevent sticking to frozen food element 36; different thickness or dimensions for the thermally insulating housing; different material for heat sink 10; different gears or other hardware for controlling the movement of piston 16 or the action of rotation controller 22; different hardware for causing the collection of compartments 24 to rotate, for example, using a grooved channel molded within the interior surface of insulating housing 6 lined with ball bearings, or providing wheels attached to the bottom of the collection of compartments 24; different hardware; different hardware or systems for programming or configuring piston-controller 14 or rotation controller 22; different electric motors for piston controller 14 or rotation controller 22; and other predetermined schedules for the rotation of the wheel of compartments 24 and activation of piston 16.

Various adaptations and combinations of features of the embodiments disclosed are within the scope of the invention as defined by the following claims.

What is claimed:

1. An apparatus for dispensing frozen aquarium food comprising:
   a. A thermally insulated housing having an interior chamber;
   b. One or more compartments arranged within the interior of said housing, said compartments each capable of containing a predetermined quantity of frozen food, and said compartments movable over a static support surface;
   c. said static support surface acting as a floor for each said compartment, and said static support surface having an aperture through which said food passes as each compartment moves over said aperture;
   d. a trap door formed in the floor of said interior chamber beneath said aperture, said trap door supporting said food after said food passes through said aperture;
   e. An actuator for dispensing, on a predetermined schedule, said frozen food through said trap door; and
   f. Cooling elements for maintaining the interior of the housing at a predetermined low temperature.

2. The apparatus of claim 1 wherein the cooling elements comprise one or more solid state cooling elements and pipes filled with refrigerant compressed by a compressor.

3. The apparatus of claim 2 wherein the cooling elements further comprise a heat sink.

4. The apparatus of claim 3 wherein the heat sink further comprises a fan.

5. The apparatus of claim 1 wherein the cooling elements comprise one or more thermo-electric modules.

6. The apparatus of claim 1 wherein the cooling elements comprise pipes filled with a refrigerant compressed by a compressor.

7. The apparatus of claim 1 wherein the actuator comprises a piston and piston controller.

8. The apparatus of claim 1 wherein:
   (a) said compartments are arranged in a wheel radially connected by spokes to a hub;
   (b) said wheel of compartments is caused to rotate on a predetermined schedule by a rotation controller; and
   (c) each said compartment is caused to be located, by said rotation controller, in a position such that the food in said compartment is aligned directly above said aperture and above said trap door;
   (d) said trap door pushed open by said actuator's pushing said food through said trap door to pass to a conduit leading to the exterior of said apparatus.

9. The apparatus of claim 8 wherein a trap door is mounted at the opening of said conduit and wherein said trap door comprises a spring-loaded hinge.

10. The apparatus of claim 9 wherein said trap door is thermally insulated.

11. The apparatus of claim 8 wherein each said compartment has a trap door formed as the floor of said compartment and wherein each said trap door has a spring-loaded hinge.

12. The apparatus of claim 1 wherein
   a. said actuator comprises a piston movable orthogonal to said static support surface, where said piston in a rest state is located directly above said hole and in an active state moves downward through said hole to push said food through said door and out of said interior chamber;
   b. whereby said food is dispensed out of said interior chamber into an aquarium on a predetermined schedule.

13. The apparatus of claim 12 wherein the piston is formed of thermally insulating material coated with a non-stick material.

14. The apparatus of claim 12 wherein the static support surface comprises a grooved circular channel for containing said food, and said static support surface is coated with a non-stick material.

15. The apparatus of claim 12 wherein the trap door is spring-loaded and closed unless acted upon by said piston and is formed of thermally insulating material coated with a non-stick material.

16. An apparatus for dispensing frozen aquarium food comprising:
   a. means for thermally insulating and housing the interior elements of the system;
   b. means for containing a predetermined quantity of frozen material;
   c. means for periodically removing the frozen material contained within at least one of said containing means, comprising means for statically supporting said containing means, said means for supporting having an aperture through which said frozen material passes as said containing means moves over said aperture, and means for egressing beneath said aperture, said means for egressing supporting said frozen material after said frozen material has passed through said aperture, and means for dispensing said frozen material out of said means for egressing; and d. means for cooling the interior of the system at a predetermined low temperature.

17. The apparatus of claim 16 wherein said means for cooling comprises one or more thermo-electric modules.

18. A method for dispensing frozen food in an aquarium comprising:

a. Arranging a predetermined quantity of frozen food in a series of individual compartments arranged within an insulated housing;

b. Dispensing said food from the compartments one at a time on a predetermined schedule, comprising moving said compartments over a static support, said static support having an aperture, passing said food through said aperture, supporting said food on a trap door positioned beneath said aperture, and egressing said food through said trap door; and c. Maintaining a low temperature within the insulated housing such that the food remains unthawed.

19. The method of claim 18 wherein maintaining a low temperature further comprises cooling the system with solid state elements combined with pipes filled with refrigerant.

20. The method of claim 18 wherein maintaining a low temperature further comprises dissipating heat from thermo-electric coolers through a heat sink.

* * * * *